Sept. 17, 1957    E. E. HUPP ET AL    2,806,917
GOVERNOR
Filed Dec. 21, 1955    2 Sheets-Sheet 2

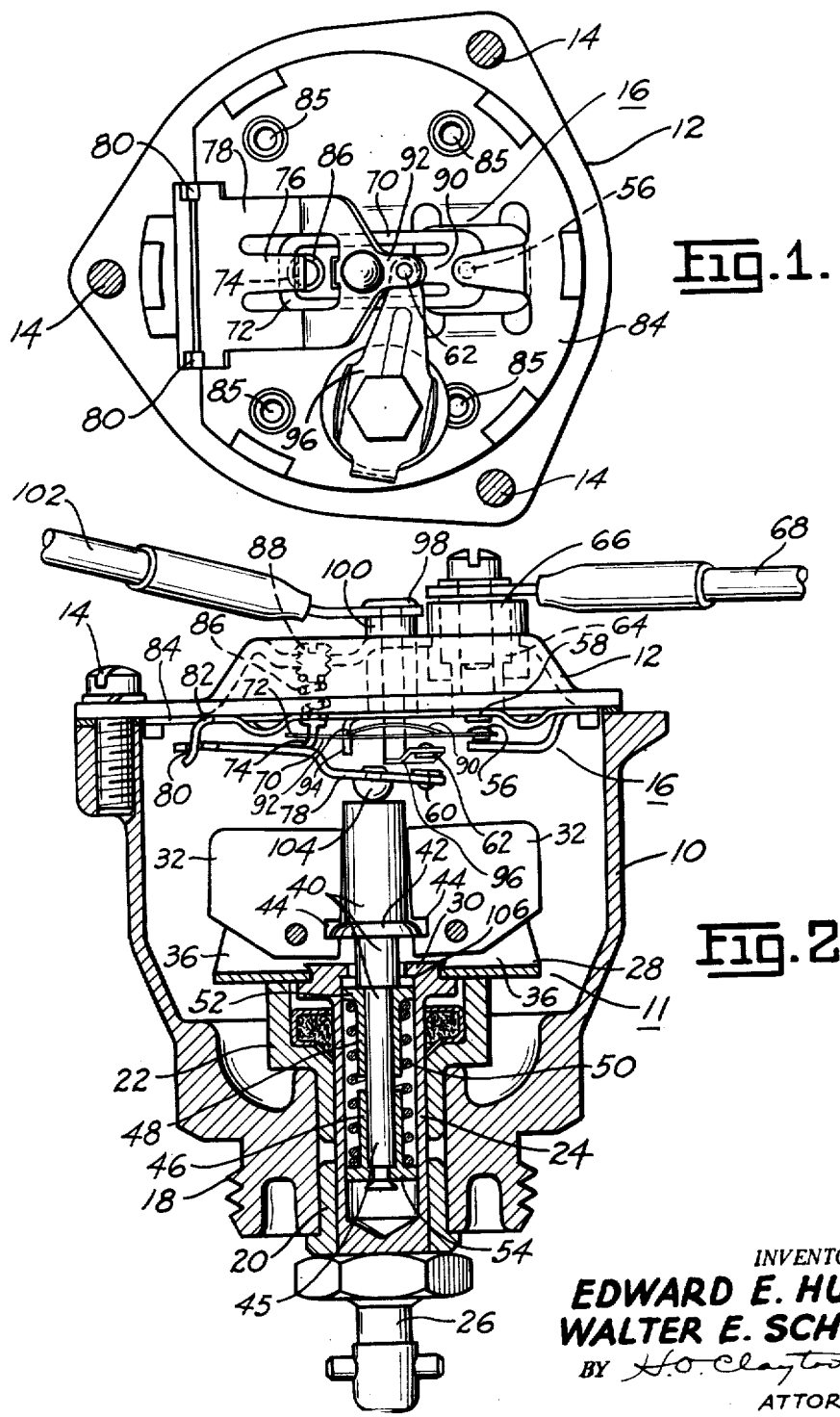

INVENTOR.
EDWARD E. HUPP.
WALTER E. SCHOCK
BY H.O.Clayton
ATTORNEY

United States Patent Office 2,806,917
Patented Sept. 17, 1957

2,806,917
GOVERNOR

Edward E. Hupp and Walter E. Schock, South Bend, Ind., assignors to Bendix Aviation Corporation, South Bend, Ind., a corporation of Delaware Application December 21, 1955, Serial No. 554,575

5 Claims. (Cl. 200—80)

This invention relates to governor operated switch mechanisms suitable for use as a control unit for automotive transmissions of an automotive vehicle.

Our invention relates to a governor actuated contact making and breaking switch mechanism designed for use in the power plant of an automotive vehicle or in connection with any device or mechanism where it is desired to coordinate a control device with the torque of a prime mover and the speed of a moving part; for example, the switch mechanism of our invention may be employed to control the change speed transmission of an automotive vehicle said mechanism being operated in accordance with the speed of the vehicle said speed in large measure being controlled by the accelerator of the vehicle which in turn in large measure controls the torque of the engine, that is the prime mover of the vehicle.

Various types of governor actuated switches have been designed in an effort to meet the demand for such a device; however, such switches have been open to certain objections such as the inability to accurately respond to the vehicle speed. It is accordingly one of the principal objects of our invention to provide a simple, compact and easily serviced governor operated switch mechanism, preferably including a snap type of switch, the operation of which is controlled by the speed of the vehicle.

Yet another object of our invention is to provide a transmission controlling governor operated multi-stage switch mechanism controlled by a vehicle speed responsive governor. Such a switch mechanism serves, at different vehicle speeds, to effect different settings of the transmission mechanism.

A further object of our invention is to provide a simple speed controlled governor operated multi-stage mechanism well adapted as a control for the automotive transmission of an automotive vehicle.

The above and other objects of the invention will appear more fully hereinafter from a consideration of the following description where one embodiment of the invention is illustrated by way of example.

Figure 1 is a top plan view of the switch mechanism of our invention;

Figure 2 is a side view of the mechanism of our invention the two-stage governor portion thereof being shown in section;

Figure 3:
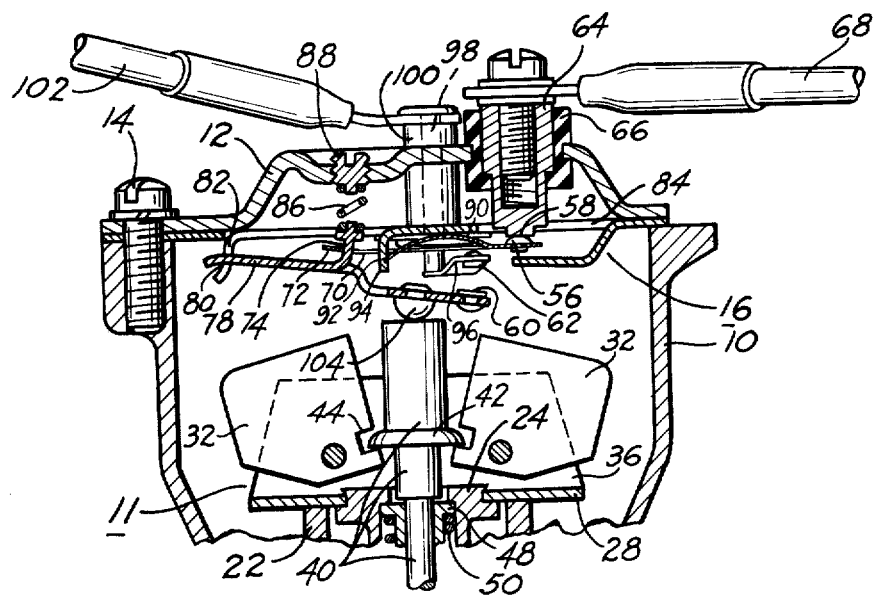
Figure 3 is a sectional view of the mechanism of our invention the parts thereof being in their first stage position.

There is disclosed in the drawings a preferred embodiment of our invention in which a cup-shaped member 10 houses a two-stage governor mechanism 11; and a cap portion 12, mounted on the member 10 by screws 14, serves as a mounting for a two parts switch mechanism 16 of said invention. The two switches going to make up this mechanism may, when closed and cooperating with the accelerator of an automotive vehicle in its control of the torque of the engine thereof, initiate certain operations of the change speed transmission of said vehicle.

Describing now the governor 11 of the mechanism of our invention, a base portion 18, Figure 2, of the housing 10 is bored to receive spaced apart cylindrically shaped bushings 20 and 22 which constitute a bearing having a tubular shaped driving pin 24 fixedly secured to a drive shaft 26. This shaft is drivably connected to the propeller shaft of the vehicle when the governor operated control switch mechanism constituting our invention is employed to control say the change speed transmission of the vehicle. A rectangular channel shaped plate 28 is fixedly secured, by rivets 30, to the driving pin 24; and two prism shaped force transmitting centrifugal weights 32 are rotatably mounted on transversely extending pins 34 fixedly mounted in the two side walls 36 of said plate. A three diametered tubular shaped thrust pin 40, having a flange 42 extending within recesses 44 in the weights 32, is mounted between said weights the small diametered portion 45 of said pin being housed within the driving pin 24. The rivets 30 in effect become a part of the driving pin of the mechanism. Spaced apart sleeve members 46 and 48 surround the portion 45 of the three diametered thrust pin 40; and a spring 50 is sleeved over said members. This spring at its upper end abuts a flange portion 52 of the sleeve member 48; and at its lower end said spring abuts an end plate 54 which is fixedly secured to the small diametered portion 45. The member 48 serves as a stop member.

Describing the switch mechanism 16 of our invention, this mechanism includes two separate and distinct switches each, when closed, serving to ground and thereby complete an electrical circuit. One of said circuits is completed when the vehicle speed reaches say 30 M. P. H. and the other when the vehicle speed reaches say 60 M. P. H.

Figure 4:
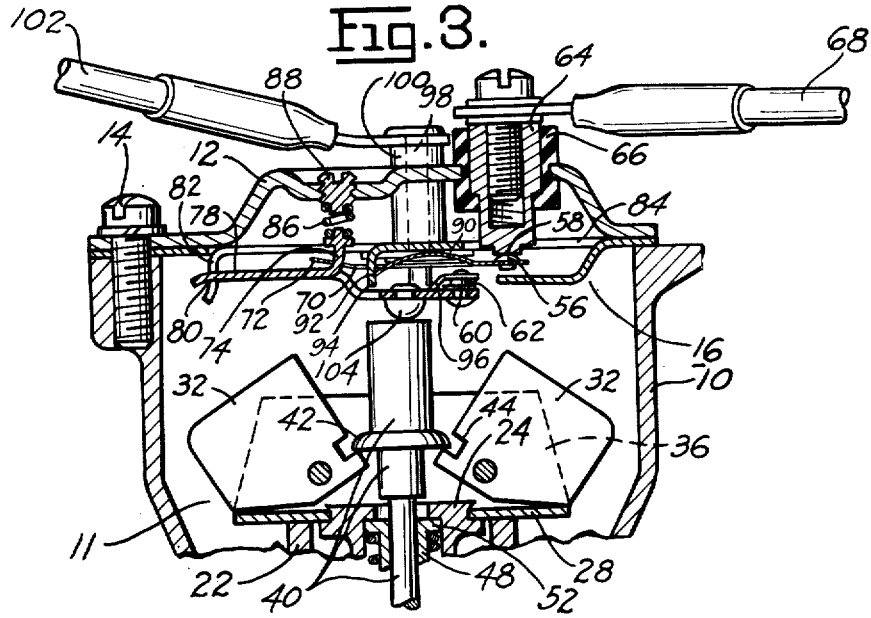
Figure 4 is a sectional view, similar to Figure 3, the parts of the mechanism being in their second stage position.

As is disclosed in Figures 2, 3 and 4, the switch which is closed at a vehicle speed of 30 M. P. H. includes movable and fixed contacts 56 and 58 respectively; and the switch closed at 60 M. P. H. includes movable and fixed contacts 60 and 62 respectively. The fixed contact 58 is electrically connected to a conductor 64 which extends through a post 66 of insulating material said post being fixedly mounted in the switch supporting cap portion 12; and to the conductor 64 there is connected a terminal or lead in wire 68. The movable contact 56 going to make up the switch 56, 58 is mounted on one end of a conductor strip 70 which is rectangular in outline. This strip, which is under tension when in operation, is secured at one of its ends 72 to a post 74 extending from a tongue member 76 which, as is disclosed in Figure 1, extends from and is integrally secured to the base portion of a generally rectangularly shaped switch operating member 78. The latter member is hinged at 80 to tabs 82, Figure 2, projecting from and secured to a plate 84 which is secured by rivets or other fastening means 85, to the base portion of the cap 12. The post 74 extends through an opening in the plate 84 and over its end there is fitted a spring 86. This spring is, at its upper end, sleeved over a set screw 88 screw threaded and therefore adjustably mounted in the upper end of the cap member 12. The adjustment of the screw 88 in part determines the time of operation of the switch 56, 58. As is clearly disclosed in Figure 1, a so-called compression strip 90 extends between the sides of the rectangularly shaped tension member 70 said strip being integral, at one of its ends, with that end of the member 70 upon which the switch contact 58 is mounted. The end of the compression strip 90 tightly abuts, that is fits within, a notch 92 in a post 94 said post being secured to the plate 84.

The movable contact 60 of the switch 60, 62 is mounted on one end of a tongue 92, Figure 1, extending from one end of the switch operating member 78; and the fixed contact 62 of said switch is mounted on one end of a tongue shaped supporting member 96. The member 96 is mounted on a post 98 of electrically conductive material said post being housed in a post 100 of insulating material. The post 100 is mounted in the cap 12 and to this post there is connected a conductor wire 102.

Describing now the operation of the two-stage governor operated switch mechanism constituting our invention, and incidentally completing the description of parts thereof not heretofore described, it will be assumed that the vehicle is traveling below say 30 M. P. H. and that the driver is depressing the accelerator to increase the vehicle speed. Then when the speed reaches 30 M. P. H. the centrifugal weight 32 will be rocked outwardly to the position disclosed in Figure 3; and in this position the thrust pin 40 has moved outwardly far enough to contact a button 104 mounted on the switch operating member 78 and to move said member upwardly, the member 78 rocking in a counterclockwise direction about its hinges 80 serving as a fulcrum. Now this movement serves to move the end portion 72 of the tension member 70 upwardly so that the plane of said member lies above the notch 92; and this operation serves to pull the tongue member 90 upwardly to move the contact 56 into contact with the contact 58 with a snap action. In this operation the member 70 is placed under tension and the member 90 is placed under compression all as is disclosed in U. S. Patents Nos. 2,170,748 and 2,170,767. The member 90 is rocked about the notch 92 as a fulcrum. The switch 56, 58 having been closed, said operation serves to operate the transmission of the vehicle or other control as desired.

In this first stage operation of the mechanism an important feature of our invention lies in the operation of the control means connected with the lower end 45 of the thrust pin 40; for it is to be noted that the flange 52, in the off position of the parts of the governor mechanism, is slightly spaced from a ledge portion 106 of the rivets 30. It follows that until the vehicle speed reaches 30 M. P. H. the spring 50, washer 54 and spaced sleeves 46 and 48, move upwardly as a unit, the relative position of said parts remaining the same. However, when the vehicle speed does reach the critical 30 M. P. H. the flange 52 comes into contact with the ledge 106 just as the switch 56, 58 is snapped to its closed position.

As to the second stage of operation of the mechanism, when the vehicle reaches a speed of say 60 M. P. H. the centrifugal force exerted by the weights 32 is great enough to move the pin 40 to the position disclosed in Figure 4; and in this operation the spring 50 is compressed until the clearance between the sleeves 46 and 48 is taken up, it being remembered that the sleeve member 48 cannot be moved beyond its position of contact with the ledge 106. This additional increment of movement of the thrust pin 40 results in a continued counterclockwise rotation of the member 78 about its fulcrum at the hinges 80; and this rotation serves to close the switch 60, 62 to initiate another operation of the change speed transmission of the vehicle or other mechanism being controlled. It is to be again noted that the closing of the two switches merely complete electrical circuits by making a ground connection; for the movable contacts 56 and 60 are connected to the body of the switch mechanism which is, of course, grounded.

There is thus provided by the mechanism of our invention, a simple, compact, effective and easily serviced two-stage switch mechanism well adapted for use in the controls of an automotive vehicle. The cooperation of the spring 50, plate 54, and spaced sleeves 46 and 48 with the fixed ledge portion 106 acting as a stop serves in large part to insure the desired first stage operation of the switch mechanism; and these same parts, particularly the spring 50, then operate in large part to insure the desired second stage switch operation of the switch mechanism. With our invention a spring of a certain loading is selected, that is, one that will not be compressed until a relatively high vehicle speed is attained, that is say 60 M. P. H.

While the preferred embodiment of the invention has been described in considerable detail, we do not wish to be limited to the particular construction shown which may be varied within the scope of the invention, and it is the intention to cover hereby all adaptations, modifications and arrangements thereof which come within the practice of those skilled in the art to which the invention relates.

We claim:

1. A governor operated switch mechanism including a body portion and a cap portion, two switches mounted on the cap portion, governor means mounted on the body portion and operable to successively close first one and then the other of said switches, said governor means comprising a driving pin, a drive shaft connected to said pin, force transmitting means, including centrifugally operated means and a mounting therefor, mounted on the driving pin, a switch operating thrust pin connected to the centrifugally operated means, and means, connected to the thrust pin and cooperating with a part of the driving pin, for controlling the operation of the force transmitting means, said control means including, as a unit, a plurality of sleeve members sleeved over a portion of the thrust pin and further including yieldable sleeved over said members.

2. A governor operated switch mechanism including a body portion and a cap portion, two switches mounted on the cap portion, governor means mounted on the body portion and operable to successively close first one and then the other of said switches, said governor means comprising a driving pin, a drive shaft connected to said pin, force transmitting means, including centrifugally operated means and a mounting therefor, mounted on the driving pin, a switch operated thrust pin connected to the centrifugally operated means, and means, connected to the thrust pin and cooperating with the centrifugally operated means, for controlling the operation of the centrifugally operated means, said control means including, as a unit, a plurality of normally spaced apart sleeve members sleeved over a portion of the thrust pin and a spring sleeved over said members.

3. A governor operated switch mechanism including a body portion and a cap portion, two switches mounted within the cap portion, governor means mounted within the body portion and operable to successively close first one and then the other of said switches, said governor means comprising a driving pin, a drive shaft connected to said pin, force transmitting means, including centrifugally operated means and a mounting therefor, mounted on the driving pin, a switch operating thrust pin connected to the centrifugally operated means, and means, connected to the thrust pin and cooperating with the centrifugally operated means, for controlling the operation of the centrifugally operated means, said control means including means movable as a unit prior to the operation of one of the switches and then having its parts moved relative to each other during the operation of the other of the switches.

4. A governor operated switch mechanism including a body portion and a cap portion, two switches mounted within the cap portion, governor means mounted within the body portion and operable to successively close first one and then the other of said switches, said governor means comprising a tubular shaped driving pin, a drive shaft connected to said pin, force transmitting means, including centrifugally operated means and a mounting therefor, mounted on the driving pin, a switch operating thrust pin connected to the centrifugally operated means and housed in part within the drive means, and means, connected to the thrust pin and cooperating with a part of the force transmitting means, for controlling the operation of the force transmitting means, said control means including a spring loosely sleeved over a portion of the thrust pin, and further including two members also loosely sleeved over said portion of said thrust pin and telescoped within the spring, said members being spaced apart, by the operation of the spring, when the parts of the governor mechanism are in their at rest position.

5. A governor operated switch mechanism including a body portion and a cap portion, two switches mounted within the cap portion, governor means mounted within the body portion and operable to successively close first one and then the other of said switches, said governor means comprising a tubular shaped driving pin, a drive shaft connected to said pin, force transmitting means, including centrifugally operated means and a mounting therefor, mounted on the driving pin, a switch operating thrust pin connected to the centrifugally operated means and in part housed within the drive means, and means, connected to the thrust pin and cooperating with a part of the force transmitting means, for controlling the operation of the force transmitting means, said control means including a spring loosely sleeved over a portion of the thrust pin, and two members also loosely sleeved over said portion of said thrust pin and telescoped within the spring, said members being spaced apart, by the operation of the spring, when the parts of the governor mechanism are in their at rest position and moved into engagement with each other when the spring is compressed.

References Cited in the file of this patent
UNITED STATES PATENTS
2,457,192    Williams _____ Dec. 28, 1948

UNITED STATES PATENT OFFICE

CERTIFICATE OF CORRECTION

Patent No. 2,806,917 September 17, 1957

Edward E. Hupp et al.

It is hereby certified that error appears in the printed specification of the above numbered patent requiring correction and that the said Letters Patent should read as corrected below.

Column 3, line 22, for "weight" read --weights--; column 4, line 33, after "yieldable" insert --means--.

Signed and sealed this 18th day of February 1958.

(SEAL)
Attest:
KARL H. AXLINE

Attesting Officer

ROBERT C. WATSON
Commissioner of Patents